United States Patent
Uchida et al.

(10) Patent No.: US 9,821,777 B2
(45) Date of Patent: Nov. 21, 2017

(54) VEHICLE BRAKE PEDAL DEVICE

(71) Applicant: TOYOTA JIDOSHA KABUSHIKI KAISHA, Toyota-shi, Aichi (JP)

(72) Inventors: Satoshi Uchida, Toyota (JP); Satoshi Yasue, Toyota (JP); Shinichiro Aoki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 175 days.

(21) Appl. No.: 15/015,910

(22) Filed: Feb. 4, 2016

(65) Prior Publication Data

US 2016/0244033 A1    Aug. 25, 2016

(30) Foreign Application Priority Data

Feb. 20, 2015  (JP) ................................. 2015-031646
Dec. 16, 2015  (JP) ................................. 2015-244850

(51) Int. Cl.
| | |
|---|---|
| *B60T 7/06* | (2006.01) |
| *G05G 1/327* | (2008.04) |
| *G05G 1/323* | (2008.04) |
| *G05G 1/30* | (2008.04) |

(52) U.S. Cl.
CPC ............... *B60T 7/065* (2013.01); *G05G 1/30* (2013.01); *G05G 1/323* (2013.01); *G05G 1/327* (2013.01)

(58) Field of Classification Search
CPC .......... B60T 7/065; G05G 1/30; G05G 1/323; G05G 1/327
See application file for complete search history.

(56) References Cited

U.S. PATENT DOCUMENTS

| | | | |
|---|---|---|---|
| 9,376,094 B2* | 6/2016 | Kitano ................... | B60T 7/065 |
| 9,523,998 B2* | 12/2016 | Sukonthapanich .... | G05G 1/327 |
| 2001/0027696 A1 | 10/2001 | Mizuma et al. | |
| 2010/0154581 A1* | 6/2010 | Sukonthapanich ..... | B60R 21/09 |
| | | | 74/512 |
| 2015/0183408 A1 | 7/2015 | Kitano | |

FOREIGN PATENT DOCUMENTS

| | | |
|---|---|---|
| JP | H11-59350 A | 3/1999 |
| JP | H11-115698 A | 4/1999 |
| JP | H11-198778 A | 7/1999 |
| JP | 2003-112615 A | 4/2003 |
| JP | 2014-040201 A | 3/2014 |

* cited by examiner

*Primary Examiner* — Thomas C Diaz
(74) *Attorney, Agent, or Firm* — Oliff PLC (57) ABSTRACT

The vehicle brake pedal device includes a pedal bracket fixed to a partition wall, a brake arm and a coupling arm assembled to the pedal bracket, a clevis and a movable plate assembled to the coupling arm, and a fixed member and a coupling bracket assembled to a vehicle body component. In the event of a front collision of the vehicle, the pedal bracket is moved backward, and the movable plate is brought into abutment against the fixed member to rotate. As a result, a push part of the movable plate is brought into abutment against the clevis, and a breakable part of the clevis is broken so that the clevis and the coupling arm are decoupled from each other. Then, the coupling arm is rotated forward with respect to the pedal bracket.

8 Claims, 12 Drawing Sheets

VEHICLE BRAKE PEDAL DEVICE

BACKGROUND OF THE INVENTION

1. Field of the Invention

The present invention relates to a vehicle brake pedal device, and more particularly, to a vehicle brake pedal device configured to suppress a backward movement of a brake pedal when a partition wall (dash panel) is moved inside a vehicle cabin as a result of a front collision of a vehicle.

2. Description of the Related Art

The vehicle brake pedal device of this type is described, for example, in Japanese Patent Application Laid-open No. 2014-40201. In the vehicle brake pedal device described in Japanese Patent Application Laid-open No. 2014-40201, a brake pedal device including a brake arm with a brake pedal pad is arranged on a vehicle cabin side of (behind) a dash panel, which is a partition wall, and a braking hydraulic pressure generation device including a brake booster and a master cylinder is arranged in front of the dash panel. Further, a link mechanism linked to the brake arm and the braking hydraulic pressure generation device are coupled to each other via a pushrod.

In the vehicle brake pedal device described in Japanese Patent Application Laid-open No. 2014-40201, the brake arm is swingably supported by a pedal bracket fixed to the dash panel. A fixed bracket is arranged behind the pedal bracket. The fixed bracket is fixed to the pedal bracket and a vehicle body component (instrumental panel reinforcement) arranged behind the pedal bracket. A coupling arm is rotatably supported by the fixed bracket. The coupling arm is coupled to the brake arm through intermediation of an arm link. The coupling arm is coupled to the pushrod. Further, a rotation arm is rotatably supported by the coupling arm.

Incidentally, when a vehicle having the vehicle brake pedal device, as described in Japanese Patent Application Laid-open No. 2014-40201, mounted thereon collides with another vehicle located in front of that vehicle, the dash panel is deformed backward (moved inside the vehicle cabin).

Then, a relative distance between the dash panel and the fixed bracket is reduced, and the fixed bracket is thus brought into contact with the coupling arm from behind. Therefore, the coupling arm is rotated forward, and the brake arm linked to the coupling arm via the arm link is rotated forward (toward a pedal depression direction) with respect to the pedal bracket.

Further, at this time, the fixed bracket is also brought into contact with the rotation arm, and the rotation arm is thus rotated. Then, the rotation arm collides with a middle part of the pushrod, to thereby bend the pushrod. Therefore, compared to a case in which the pushrod is not bent, the coupling arm is easily rotated in a direction in which the brake arm rotates forward.

In this way, when the dash panel is deformed backward, the brake pedal is rotated forward (in the brake depression direction) with respect to the pedal bracket. Thus, a backward movement amount of the brake pedal pad can be small even though the dash panel is deformed backward.

In the vehicle brake pedal device described in Japanese Patent Application Laid-open No. 2014-40201, in order to secure the forward rotation of the brake arm when the dash panel is deformed backward, the pushrod is bent by the rotation arm.

However, in a small vehicle (such as a minivan), a fore-and-aft length of the pushrod is small, thereby being difficult to bend the pushrod by the rotation arm. In other words, this brake pedal device cannot be mounted on this type of vehicle.

SUMMARY OF THE INVENTION

The present invention has been made in view of the above-mentioned problem, and therefore has an object to provide a vehicle brake pedal device, which is capable of making a backward movement amount of a brake pedal pad small when a partition wall configured to support a pedal bracket is deformed backward, and is mountable also on a vehicle having a short push rod (such as a minivan).

According to the present invention, there is provided a vehicle brake pedal device (100, 200), including:

a pedal bracket (20), which is arranged between a partition wall (10) configured to partition an outside and an inside of a vehicle cabin from each other and a vehicle body component (50) arranged behind the partition wall, and is fixed to the partition wall;

a brake arm (30), which is swingably supported by the pedal bracket, the brake arm including a brake pedal pad (31);

a coupling arm (40), which is swingably supported by the pedal bracket, coupled at a portion located below a rotational center (41) of the coupling arm to a top end of the brake arm via an arm link, and is coupled at a portion located above the rotational center to a pushrod (90) linked to a braking device via a clevis (70, 110);

a movable plate (80), which is supported by the coupling arm under a state in which a rotation of the movable plate is restricted, and is rotatable with respect to the coupling arm when the restriction of the rotation is released;

a fixed member (50), which is fixed to the vehicle body component, and is configured to be brought into abutment against the movable plate when the pedal bracket is displaced backward to release the restriction of the rotation, to thereby rotate the movable plate with respect to the coupling arm; and a coupling bracket (60), which is arranged behind the coupling arm, and is configured to couple the vehicle body component and the pedal bracket to each other, in which:

when the brake pedal pad is depressed forward so that the pushrod is pushed forward, the braking device is activated; and when the pedal bracket is displaced backward, the movable plate rotated with respect to the coupling arm is brought into contact with the clevis to break a breakable part (72, 110b4, 110c4), which is a coupling part of the clevis to the coupling arm, and the coupling bracket pushes forward the coupling arm displaced backward together with the pedal bracket to move the brake pedal pad forward while rotating the brake arm.

In the vehicle brake pedal device according to the present invention, the forward depression of the brake pedal pad rotates each of the brake arm and the coupling arm with respect to the pedal bracket, to thereby push the pushrod forward, with the result that the braking device is caused to generate the braking force.

Incidentally, in the vehicle brake pedal device according to the present invention, the movement of the partition wall toward the vehicle cabin due to the front collision of the vehicle moves the pedal bracket backward, and the brake arm, the coupling arm, the movable plate, and the like are also moved backward. As a result, in an early stage of action after the collision, the movable plate is brought into abutment against the fixed member, and the movable plate is released from the restriction of rotation with respect to the coupling arm, and is rotated. Thus, the movable plate interferes with (is brought into abutment against) the clevis so that the breakable part of the clevis is broken. Therefore, the clevis and the coupling arm are decoupled from each other.

Moreover, in a later stage of action after the collision, the coupling arm is brought into abutment against the coupling bracket so that the coupling arm is pushed forward with respect to the pedal bracket. As a result, the coupling arm is rotated with respect to the pedal bracket, and consequently, the brake arm is rotated with respect to the pedal bracket so that the brake pedal pad is moved forward. Thus, the backward movement of the brake pedal pad can be suppressed.

As described above, according to the present invention, the rotation of the movable plate with respect to the coupling arm breaks the clevis at the breakable part thereof so that the clevis and the coupling arm are decoupled from each other. Therefore, the length (length in a vehicle fore-and-aft direction) of the pushrod can appropriately be set. Thus, this brake pedal device can be mounted even on a vehicle (such as a minivan) in which a length in the vehicle fore-and-aft direction between the partition wall and each of the vehicle body component and the coupling bracket is short and the length of the pushrod employed for this device is short.

For carrying out the present invention described above, a center (81) of a rotational axis of the movable plate may be set behind and above a portion at which the movable plate and the clevis are brought into abutment against each other. In this case, at the portion at which the movable plate and the clevis are brought into abutment against each other, a component force in a disengagement direction (downward direction) can be generated in the pushrod and the clevis, to thereby secure the disengagement (downward movements) of the pushrod and the clevis.

Further, for carrying out the present invention described above, the coupling arm may include a guide part (40*a*), which is configured to guide backward and downward the clevis decoupled from the coupling arm. In this case, the clevis is guided backward and downward by the guide part of the coupling arm after the clevis is decoupled from the coupling arm, thereby being capable of reducing such a fear (possibility) that the push rod is caught on the coupling arm.

Further, for carrying out the present invention described above, the movable plate may include a push part (83), which is configured to be brought into abutment against the clevis when the movable plate is rotated with respect to the coupling arm, the clevis (70) may include: a base part (70A) configured to fasten the pushrod; and a pair of arm parts (70B, 70C) extending backward from the base part and being positioned on both right and left sides of the coupling arm, the base part may have a mounting hole (70*a*1) through which an end of the pushrod is inserted, one of the pair of arm parts (70A) may have: an insertion round hole (70*b*1) through which a coupling pin (71) configured to couple the coupling arm and the clevis to each other is inserted; and a cutout (43) defining the breakable part, the other of the pair of arm parts (70B) may have an insertion longhole (70*c*1) through which the coupling pin is inserted, and the insertion longhole may have: a straight part (70*c*1*a*) capable of transmitting a rotational force of the coupling arm to the clevis; and an open part (70*c*1*b*) configured to allow passage of the coupling pin when the push part is brought into abutment against the clevis. In this case, the clevis can appropriately be broken at the predetermined position, and a breaking load can be reduced.

Further, for carrying out the present invention described above, the movable plate may include a push part (83), which is configured to be brought into abutment against the clevis when the movable plate is rotated with respect to the coupling arm, and the clevis (110) may have: an insertion round hole (110*b*1, 110*c*1) through which a coupling pin (71) configured to couple the coupling arm and the clevis to each other is inserted; a guide groove (110*b*2, 110*c*2) including a through groove extending from the insertion round hole toward an outer peripheral edge side of the clevis and being smaller in a width than a diameter of the insertion round hole; and the breakable part (110*b*4, 110*c*4), which is formed between an end of the guide groove on a side opposite to the insertion round hole and the outer peripheral edge, and is configured to be broken after the push part is brought into abutment against the clevis. In this case, the breaking load of the clevis can further be reduced. Further, when the clevis is broken, the peripheral edge of the guide groove is not deformed, and hence a gap larger than the diameter of the coupling pin is easily formed in the broken part. Therefore, such a fear that the coupling pin is caught on the broken part is low, thereby being capable of securely disengaging the clevis from the coupling pin.

In the description above, the reference symbols used in embodiments are enclosed in parentheses and assigned to the components of the invention corresponding to the embodiments for easier understanding of the invention, but each constituent element of the invention is not limited to the embodiments defined by the reference symbols.

Other objects, other features, and accompanying advantages of the present invention are easily understood from the description of embodiments of the present invention to be given referring to the following drawings.

DETAILED DESCRIPTION OF THE PREFERRED EMBODIMENTS

Figure 1:
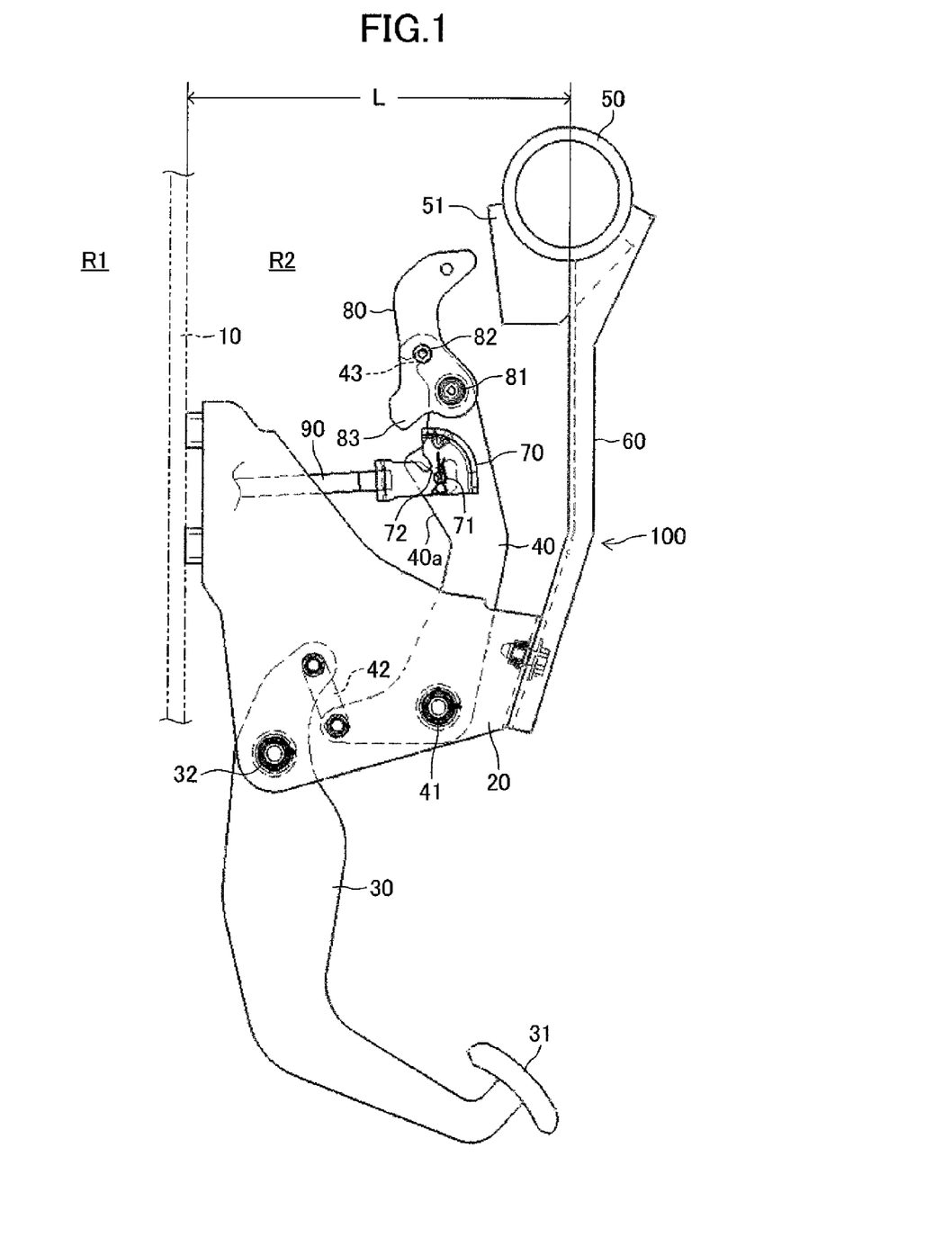
FIG. 1 is a side view of a vehicle brake pedal device in a normal state (before a collision) according to a first embodiment of the present invention.

A description is now given of a first embodiment of the present invention with reference to the drawings. FIG. 1 is a view for illustrating a vehicle brake pedal device according to the first embodiment of the present invention. A vehicle brake pedal device 100 of this embodiment is arranged behind a metal dash panel 10, which is a partition wall partiti0oning an engine room R1 and a vehicle cabin space R2 from each other. An upper end of the dash panel 10 is fixed by spot welding or the like to a metal cowl inner panel (not shown) which constitutes a part of a cowl and is arranged so that a longitudinal direction thereof corresponds to a vehicle widthwise direction. Moreover, the dash panel 10 is fixed at a bottom end thereof to a metal floor panel (not shown) by the spot welding or the like.

As illustrated in FIG. 1, the vehicle brake pedal device 100 includes a metal pedal bracket 20 fixed to a rear surface of the dash panel 10, a metal brake arm 30 rotatably supported by the pedal bracket 20, and a metal coupling arm 40 also rotatably supported by the pedal bracket 20. The pedal bracket 20 is arranged between the dash panel 10 and a well-known metal instrument panel reinforcement (vehicle body component) 50 arranged behind the dash panel 10. A front end of the pedal bracket 20 is fixed to the dash panel 10. A rear end of the pedal bracket 20 is fixed to the instrumental panel reinforcement 50 via a metal coupling bracket 60. A fixed member 51 is fixed to a front surface of a bottom part of the instrument panel reinforcement 50. The coupling bracket 60 is arranged behind the coupling arm 40. The coupling bracket 60 is fixed at an upper end thereof to the instrument panel reinforcement 50, and is fixed at a bottom end thereof to a rear end of the pedal bracket 20. Further, immediately behind the coupling bracket 60, a component group (not shown) constructing a part of a steering device configured to operate along with a rotation of a steering wheel (not shown) is arranged.

The brake arm 30 includes a brake pedal pad 31 at a bottom end thereof. An upper part of the brake arm 30 is supported by a forward bottom part of the pedal bracket 20 via a support shaft 32 so as to be swingable in a fore-and-aft direction (rotatable about the support shaft 32). The brake pedal pad 31 is configured to be capable of receiving a forward and obliquely downward depression force (legpower) by a driver. Thus, when the depression force by the driver is applied to the brake pedal pad 31, the brake arm 30 is rotated in a clockwise direction of FIG. 1 about the support shaft 32.

The coupling arm 40 is supported at a bottom part thereof by a backward bottom part of the pedal bracket 20 via a support shaft 41 so as to be swingable in the fore-and-aft direction (rotatable about the support shaft 41). Moreover, the coupling arm 40 is coupled at a bottom end thereof to an upper end of the brake arm 30 via an arm link 42. Further, on a front surface of the coupling arm 40, a guide part (inclined part) 40a inclined with respect to a vertical direction is provided. Further, a cutout 43 is formed on a front surface of the upper end of the coupling arm 40.

Moreover, a clevis 70 and a movable plate 80 are assembled to an upper part of the coupling arm 40.

Figure 3:
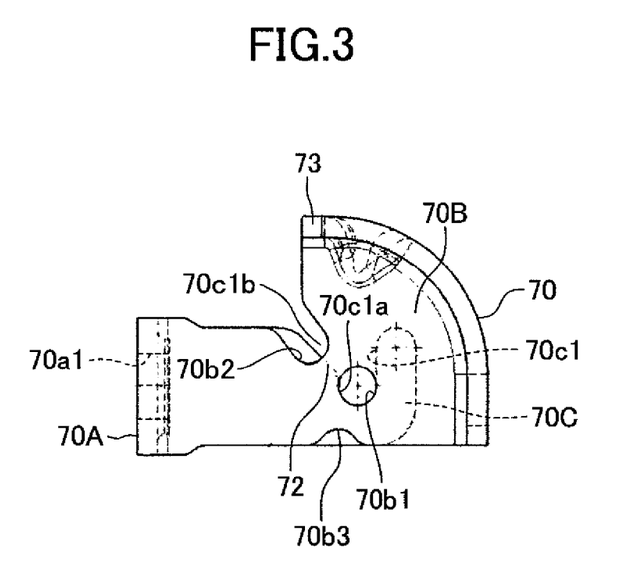
FIG. 3 is an enlarged side view of a clevis alone illustrated in FIG. 1 and FIG. 2.
Figure 4:
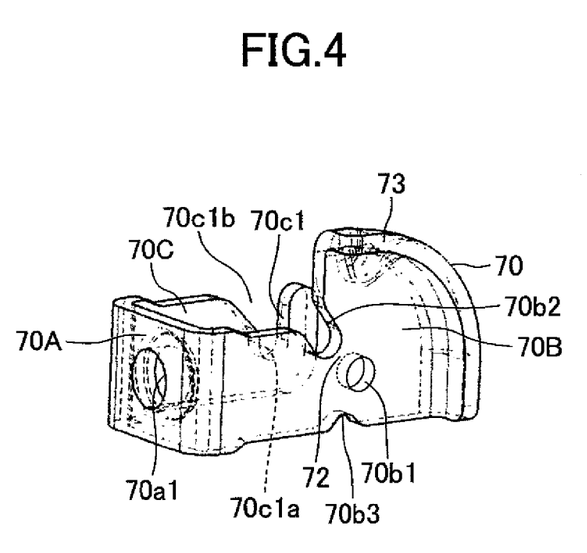
FIG. 4 is a perspective view of the clevis alone illustrated in FIG. 3.

As illustrated in FIG. 3 and FIG. 4 in an enlarged manner, the metal clevis 70 includes a base part 70A, and a pair of left and right arm parts 70B and 70C extending backward from the base part 70A. The base part 70A has a rectangular shape, and a mounting hole (round hole) 70a1 is formed at a center thereof. On the other hand, the arm part 70B includes a flange part (highly rigid part) 73 having an arc shape in side view, which extends along an upper edge and a rear edge of the arm part 70B. The flange part 73 is high in the rigidity against an external force (such as a bending force or a twisting force) applied to the clevis 70 compared to the other parts of the clevis 70. Further, an insertion round hole 70b1 and cutouts 70b2 and 70b3 are formed in the one arm part 70B. A portion located between the insertion round hole 70b1 and the cutout 70b2 of the arm part 70B comprises a breakable part 72. In other words, the insertion round hole 70b1 and the cutout 70b2 define a position and a size of the breakable part 72. Moreover, the other arm part 70C has an insertion longhole 70c1 opened at a top end thereof. A lower part of the insertion longhole 70c1 is defined by a straight part 70c1a extending in the vertical direction. An upper part of the insertion longhole 70c1 is defined by an open part 70c1b. Note that, the clevis 70 has an inclined surface defining a front end of the open part 70c1b.

A rear end vicinity part of a push rod 90 is inserted into and fixed to (fasten to) the mounting hole 70a1 of the base part 70A of the clevis 70. Further, a metal coupling pin 71 extending in the vehicle widthwise direction is inserted into the insertion round hole 70b1 and the straight part 70c1a of the clevis 70. A center part of the coupling pin 71 passes through the coupling arm 40, and is fixed to the coupling arm 40. An outer diameter of the coupling pin 71 is approximately equal to (slightly smaller than) a diameter of the insertion round hole 70b1 and a fore-and-aft width of the straight part 70c1a, and is apparently smaller than a fore-and-aft width of the opening part 70c1b.

On the other hand, in front of the dash panel 10 (in the engine room R1 side), a braking hydraulic pressure generation device (not shown; including a brake booster and a master cylinder) configured to generate a braking hydraulic pressure is arranged. The braking hydraulic pressure generation device is linked to a braking device provided for each wheel. A front end of the push rod 90 is linked to the braking hydraulic pressure generation device.

Figure 2:
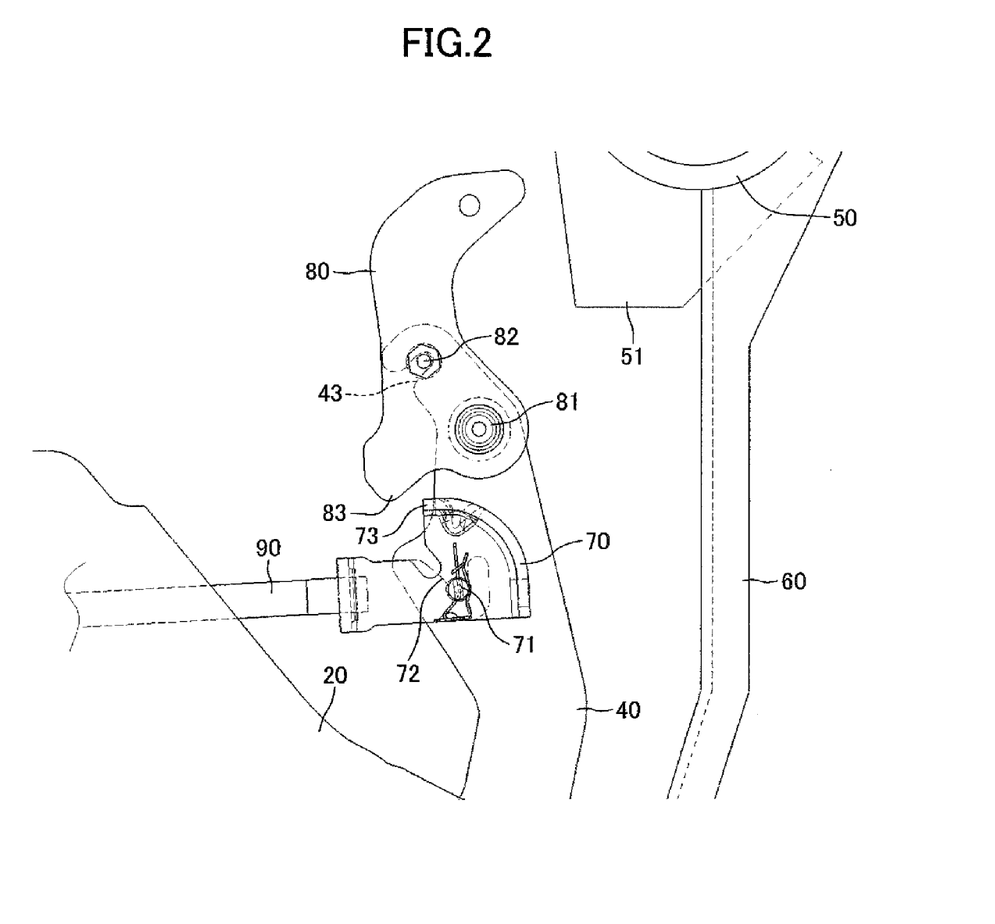
FIG. 2 is an enlarged view of a main part of FIG. 1.

As illustrated in FIG. 1 and FIG. 2, the metal movable plate 80 is supported by the upper end of the coupling arm 40 above the clevis 70 via a support shaft 81 so as to be swingable in the fore-and-aft direction (rotatable about the support shaft 81). Moreover, a metal hold pin 82 extending in the right-and-left direction is fixed to the movable plate 80. The hold pin 82 protrudes in the vehicle widthwise direction from a side surface of the movable plate 80. The hold pin 82 is engageable with and disengageable from the cutout 43 formed in the coupling arm 40. The engagement of the hold pin 82 with the cutout 43 holds the hold pin 82 in a predetermined position (position illustrated in FIG. 1 and FIG. 2). In other words, the engagement of the hold pin 82 with the cutout 43 restricts a rotation of the movable plate 80 with respect to the coupling arm 40. Further, the movable plate 80 is provided with a push part 83.

In the vehicle brake pedal device 100 constructed as described above, in a normal state (in a state before the vehicle having the vehicle brake pedal device 100 mounted thereon collides with another vehicle or the like), the respective components are in the state illustrated in FIG. 1 and FIG. 2. Therefore, the forward and obliquely downward depression of the brake pedal pad 31 by the driver rotates each of the brake arm 30 and the coupling arm 40 with respect to the pedal bracket 20. Then, the coupling pin 71 pushes forward the front end surfaces of the insertion round hole 70b1 and the straight part 70c1a of the clevis 70, resulting in a forward movement of the pushrod 90. Then, the braking hydraulic pressure generation device operates so that the braking force is applied from each of the braking devices to each of the wheels.

Figure 5:
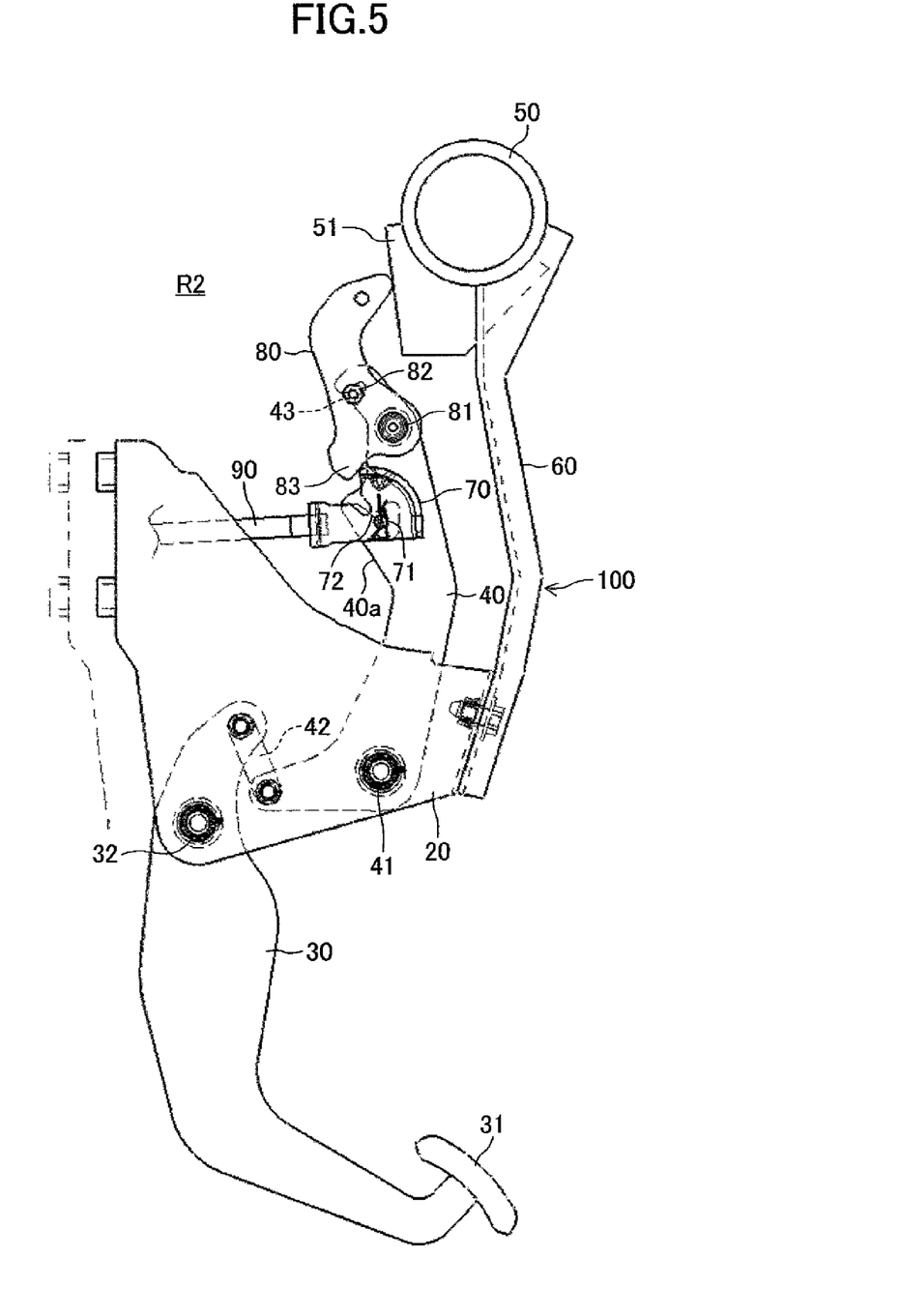
FIG. 5 is a side view of a state of the vehicle brake pedal device illustrated in FIG. 1 immediately after the collision (state in which a movable plate abuts against a fixed member).

Incidentally, when the vehicle having the vehicle brake pedal device 100 mounted thereon collides with another vehicle or the like located in front of that vehicle, the dash panel 10 is moved toward the vehicle cabin space R2 (backward) while being deformed. Then, as illustrated in FIG. 5, the pedal bracket 20 is moved backward, and the brake arm 30, the coupling arm 40, the movable plate 80, and the like are also moved backward. Further, the coupling bracket 60 coupled to the pedal bracket 20 is deformed backward. As a result, in an early stage of action after the collision, the vehicle brake pedal device 100 shifts to a state of FIG. 6 via the state of FIG. 5. In other words, the upper end of the movable plate 80 is brought into abutment against the fixed member 51, and the movable plate 80 is rotated in a counterclockwise direction of FIG. 5 about the support shaft 81 with respect to the coupling arm 40 by a reaction force applied by the fixed member 51. Then, the movable plate 80 is rotated while releasing the hold pin 82 from the cutout 43 (in other words, while releasing the restriction of the rotation, which is imposed on the movable plate 80 by the hold pin 82 and the cutout 43). Therefore, the push part 83 of the movable plate 80 collides with the front end of the flange part 73 of the clevis 70 from the front, and an impact force generated in the clevis 70 at this time breaks the breakable part 72. Then, a portion located behind the broken part of the arm part 70B is relatively rotated backward about the cutout 70b3 with respect to a portion located in front of the broken part (bisected part). Therefore, the coupling between the clevis 70 and the coupling arm 40 via the hold pin 82 and the cutout 43 is released.

Figure 6:
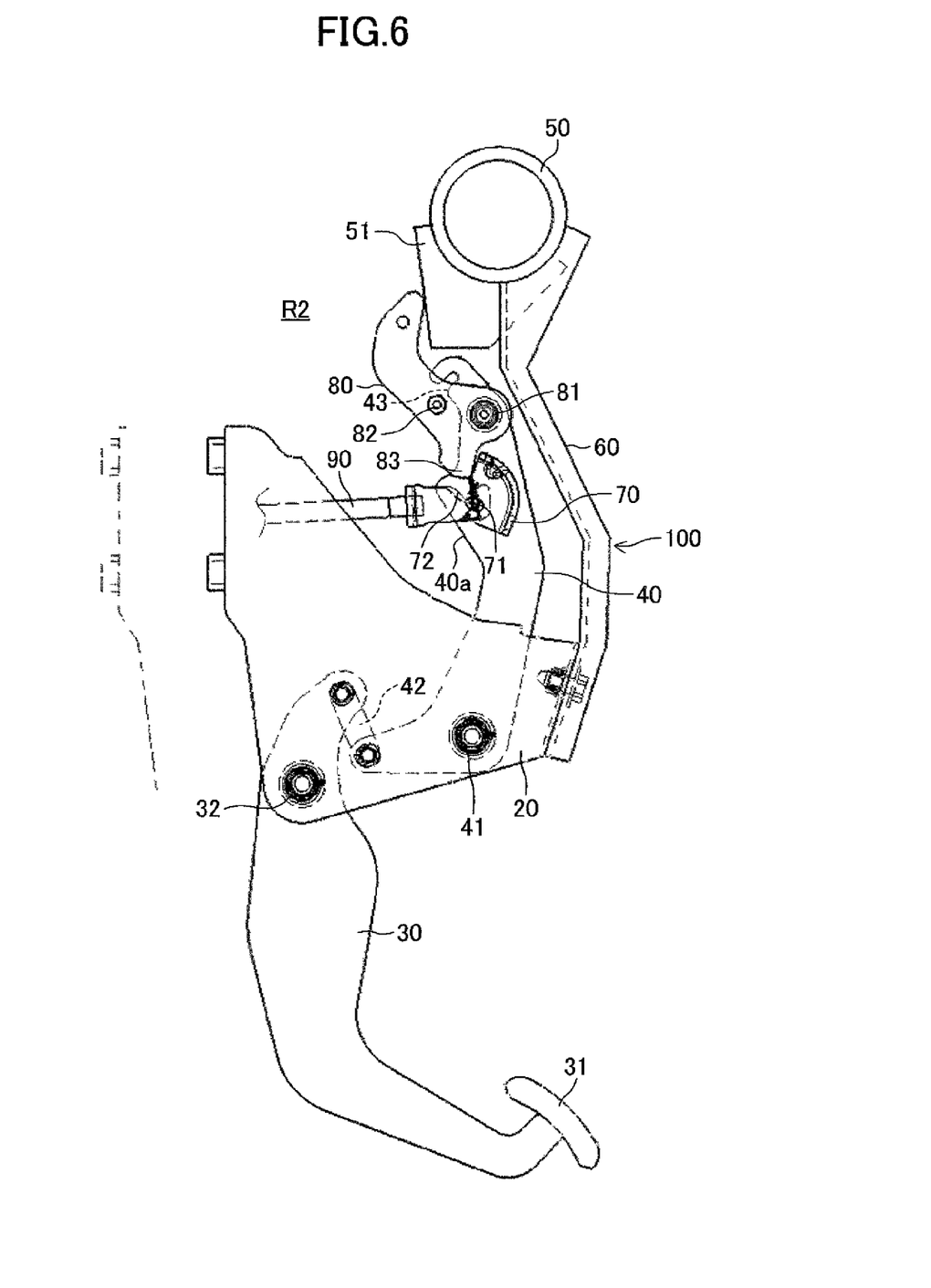
FIG. 6 is a side view of a state of an early stage of action of the vehicle brake pedal device illustrated in FIG. 5 after the collision (state in which the movable plate has broken the clevis).

Moreover, also in a later stage of action after the collision, the vehicle brake pedal device 100 shifts from the state of FIG. 6 to a state of FIG. 7. In other words, the coupling pin 71 fixed to the coupling arm 40 disengages upward with respect to (escapes upward from) the clevis 70 through the broken part formed in the breakable part 72 of the clevis 70, the straight part 70c1a, and the open part 70c1b. The fore-and-aft width of the open part 70c1b is (apparently) lager than the outer diameter of the coupling pin 71, and thus, at this time, the coupling pin 71 smoothly disengages (escapes) upward from the open part 70c1b. Moreover, the clevis 70, which has been released from the coupling pin 71, is guided backward and obliquely downward along the guide part 40a of the coupling arm 40. Therefore, after the clevis 70 is decoupled from the coupling arm 40 (coupling pin 71), such a fear that the clevis 70 and the pushrod 90 are caught on the coupling arm 40, and, as a result, the downward movements of the clevis 70 and the pushrod 90 are blocked is low.

Thus, a force is not transmitted between the coupling arm 40 and the pushrod 90. Therefore, even if the pushrod 90 is moved backward due to the collision, the coupling arm 40, the arm link 42, and the brake arm 30 are not rotated by a force caused by the backward movement of the pushrod 90.

Further, an intermediate part of the coupling bracket 60 in the vertical direction, which is deformed backward along with the backward movement of the pedal bracket 20, collides with the component group of the above-mentioned steering device located immediately behind the coupling bracket 60. Therefore, as illustrated in FIG. 7, the intermediate part of the coupling bracket 60 in the vertical direction is bent forward. The bent part of the intermediate part of the coupling bracket 60 then pushes forward an upper part of the coupling arm 40 with respect to the pedal bracket 20. As a result, the coupling arm 40 is rotated with respect to the pedal bracket 20 (the coupling arm 40 is rotated in a counterclockwise direction of FIG. 7 about the support shaft 41 with respect to the pedal bracket 20), and consequently, the brake arm 30 is rotated with respect to the pedal bracket 20 (the brake arm 30 is rotated in a clockwise direction of FIG. 7 about the support shaft 32 with respect to the pedal bracket 20) so that the brake pedal pad 31 is moved forward. Thus, a backward movement of the brake pedal pad 31 can be suppressed even though the dash panel 10 is moved (deformed) backward.

Figure 7:
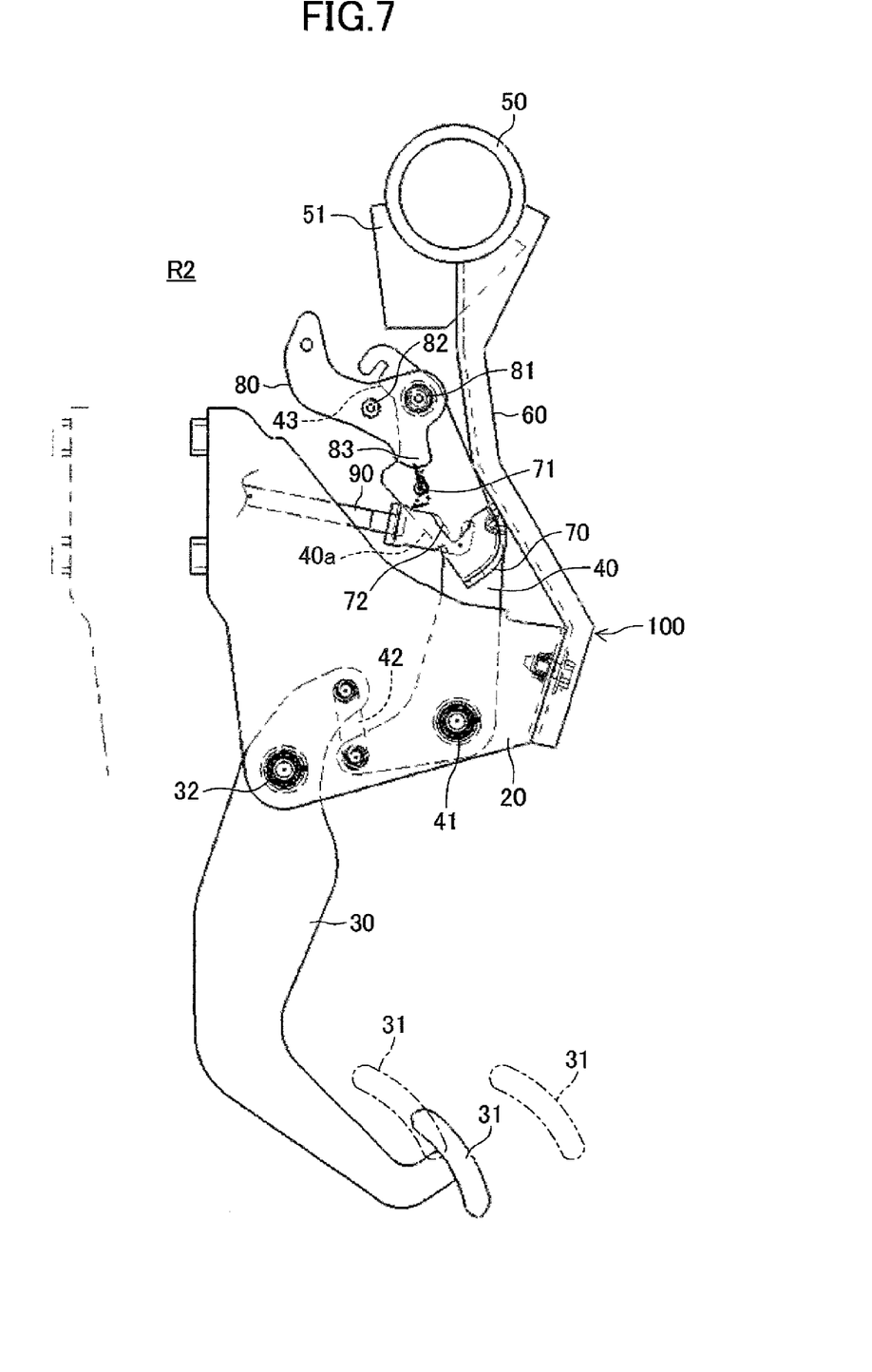
FIG. 7 is a side view of a state of a later stage of action of the vehicle brake pedal device illustrated in FIG. 5 after the collision (state in which a coupling arm is brought into abutment against a coupling bracket so that the coupling arm is tilted forward).

The brake pedal pad 31 indicated by the long dashed short dashed line of FIG. 7 indicates a position of the brake pedal pad 31 when the above-mentioned vehicle brake pedal device 100 is in the state of FIG. 1. The brake pedal pad 31 indicated by the long dashed double-short dashed line of FIG. 7 indicates a position of the brake pedal pad 31 when the above-mentioned vehicle brake pedal device 100 is in the state of FIG. 6.

As described above, in the vehicle brake pedal device 100, when the dash panel 10 is deformed backward due to a collision of the vehicle or the like, the clevis 70 can be appropriately broken at a predetermined position, and the breakable part 72 of the clevis 70 can be limited to the one position on the arm part 70B side, thereby being capable of reducing a breaking load. Therefore, the rotation of the movable plate 80 with respect to the coupling arm 40 breaks the clevis 70 at the breakable part 72 so that the clevis 70 and the coupling arm 40 are decoupled from each other. In other words, the pushrod 90 is not bent (does not need to be bent). Therefore, the length (length in the vehicle fore-and-aft direction) of the pushrod 90 can appropriately be set. Thus, the brake pedal device 100 can be mounted even on a vehicle (such as a minivan) in which a length L (refer to FIG. 1) in the vehicle fore-and-aft direction between the dash panel 10 and each of the instrument panel reinforcement 50 and the coupling bracket 60 is short and the length of the pushrod 90 is short.

Moreover, in the above-mentioned vehicle brake pedal device 100, the center of the rotational axis (support shaft 81) of the movable plate 80 is set behind and above the collision portion between the push part 83 of the movable plate 80 and the flange part 73 of the clevis 70 (the abutment portion between the movable plate 80 and the clevis 70 illustrated in FIG. 5). Thus, the impact force in a direction orthogonal to a straight line connecting the support shaft 81 and the collision portion to each other is generated in the clevis 70. Therefore, (a component force of) the impact force generated in the clevis 70 when the push part 83 collides with the flange part 73 becomes a force in the direction (downward direction) of breaking the breakable part 72 and disengaging the clevis 70 from the coupling pin 71. Thus, the disengagement (downward movement) of the pushrod 90 and the clevis 70 from the coupling pin 71 (coupling arm 40) can be secured.

Next, referring to FIG. 8 to FIG. 13, a description is given of a second embodiment of the present invention. Note that, same components as those of the first embodiment are denoted by same reference symbols, and a detailed description thereof is omitted. Note that, the "same component" encompasses a component completely the same in a shape and a function as well as a component somewhat different in the shape but substantially the same in the function.

The feature of a vehicle brake pedal device 200 according to this embodiment resides in a clevis 110.

Figure 8:
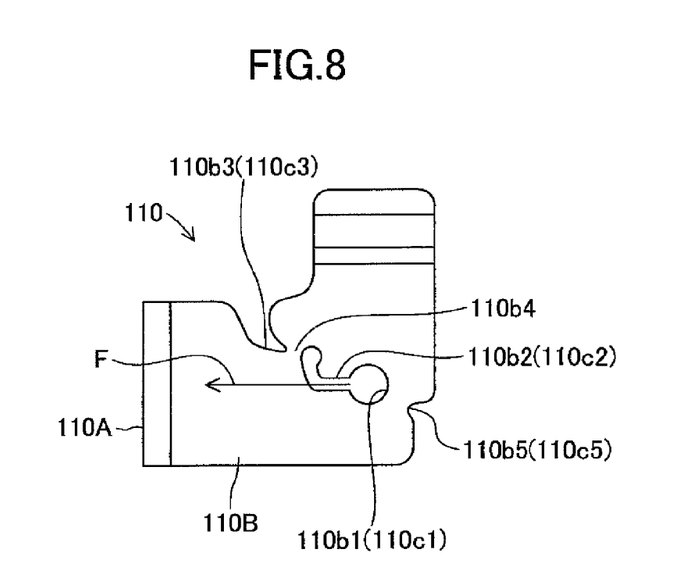
FIG. 8 is a side view of a clevis alone according to a second embodiment of the present invention.
Figure 9:
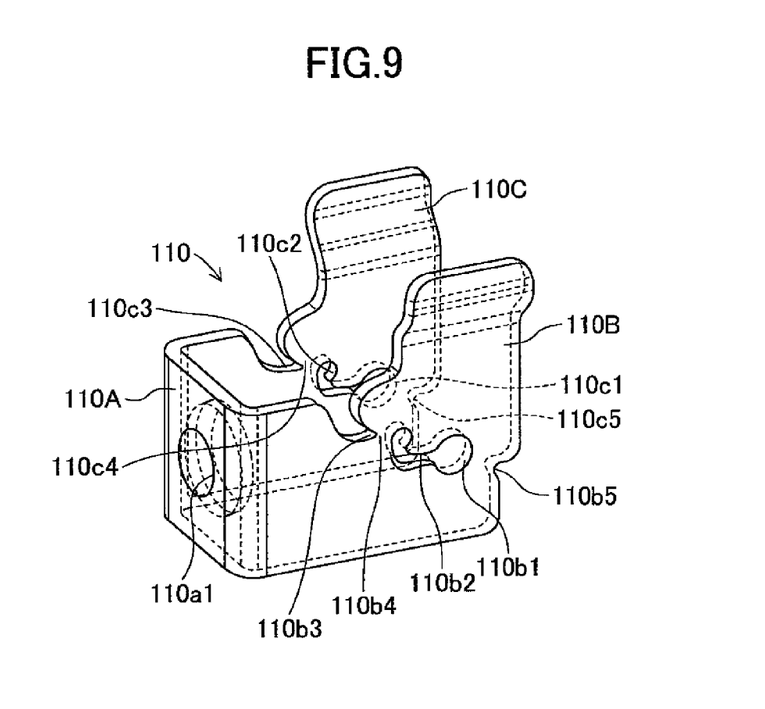
FIG. 9 is a perspective view of the clevis alone according to the second embodiment of the present invention.

As illustrated in FIG. 8 and FIG. 9 in an enlarged manner, the metal clevis 110 includes a base part 110A, and a pair of left and right arm parts 110B and 110C extending backward from the base part 110A. The base part 110A has a rectangular shape, and a mounting hole (round hole) 110a1 is formed at a center thereof. The left and right arm parts 110B and 110C have the same shape. The left and right arm parts 110B and 110C have insertion round holes 110b1 and 110c1, and guide grooves 110b2 and 110c2 formed by through grooves extending forward respectively from front ends of the insertion round holes 110b1 and 110c1 and then extending upward (in other words, respectively toward outer peripheral edge sides of the arm parts 110B and 110C). Further, first cutouts 110b3 and 110c3 extending toward front end sides of the guide grooves 110b2 and 110c2 and having tapered distal ends (rear ends) are formed in the outer peripheral edges of the left and right arm parts 110B and 110C. Further, breakable parts 110b4 and 110c4 are respectively formed between the front ends of the guide grooves 110b2 and 110c2 and the rear ends of the first cutouts 110b3 and 110c3. Further, second cutouts 110b5 and 110c5 are respectively formed in the outer peripheral edges of the left and right arm parts 110B and 110C.

The clevis 110 is coupled to the coupling arm 40 and the pushrod 90 in the same manner as that of the first embodiment. In other words, the rear end vicinity part of the push rod 90 is inserted into and fixed to (fasten to) the mounting hole 110a1 of the base part 110A of the clevis 110. Further, both left and right ends of the coupling pin 71 are respectively inserted into the left and right insertion round holes 110b1 and 110c1 of the clevis 110. The outer diameter of the coupling pin 71 is slightly smaller than (in other words, approximately equal to) diameters of the insertion round holes 110b1 and 110c1, and is apparently larger than widths of the guide grooves 110b2 and 110c2.

Figure 10:
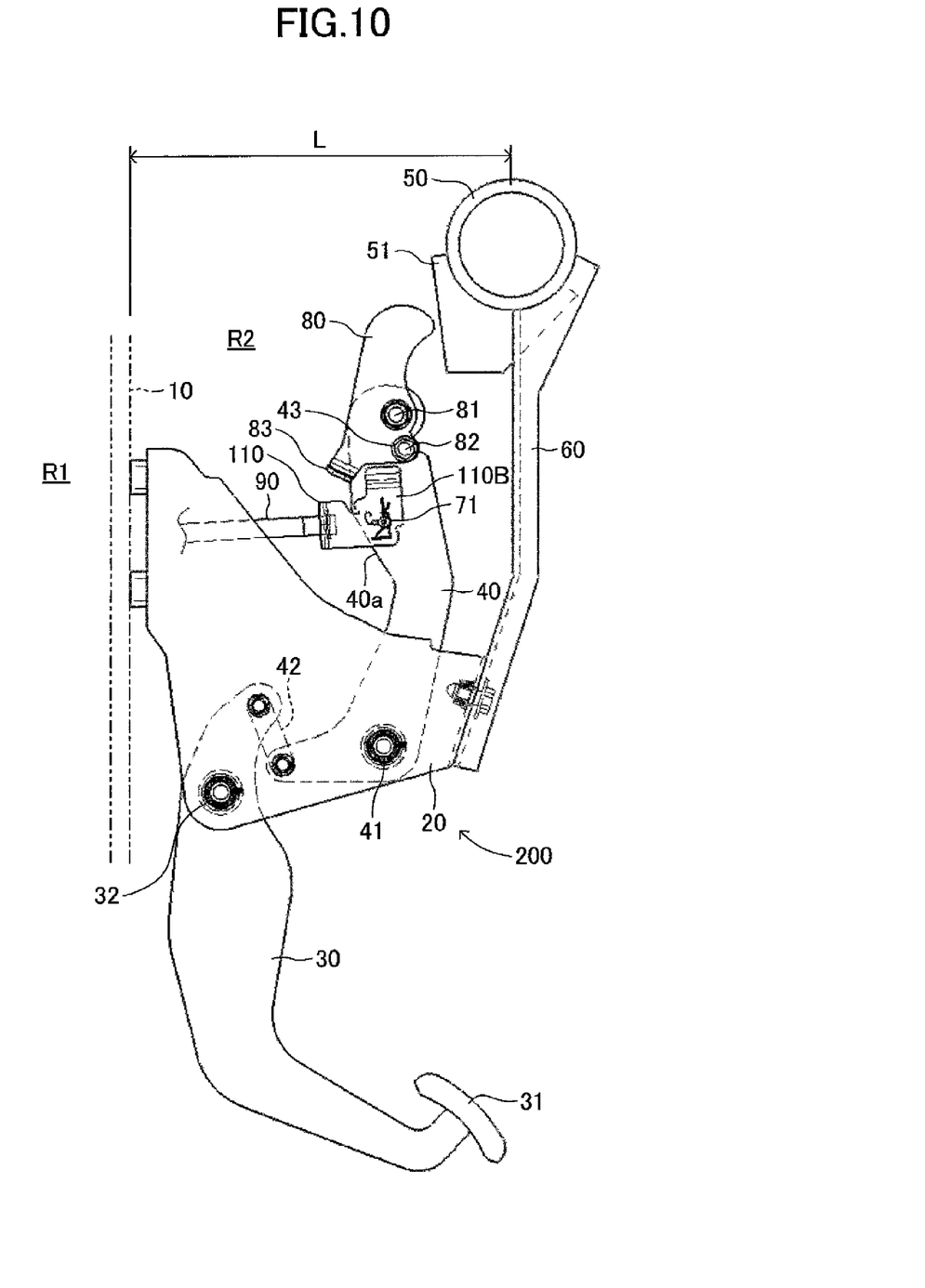
FIG. 10 is a side view of the vehicle brake pedal device of the second embodiment corresponding to FIG. 1.

In the vehicle brake pedal device 200, in the normal state (in the state before the vehicle having the vehicle brake pedal device 200 mounted thereon collides with another vehicle or the like), the respective components are in a state illustrated in FIG. 10. Therefore, when the forward and obliquely downward depression of the brake pedal pad 31 by the driver rotates each of the brake arm 30 and the coupling arm 40 with respect to the pedal bracket 20, the coupling pin 71 applies a forward and approximately horizontal pressing force F (refer to FIG. 8) to the front ends of the left and right insertion round holes 110b1 and 110c1 of the clevis 110. As a result, the pushrod 90 is moved forward to activate the braking hydraulic pressure generation device so that the braking force is applied from each of the braking devices to each of the wheels.

Figure 11:
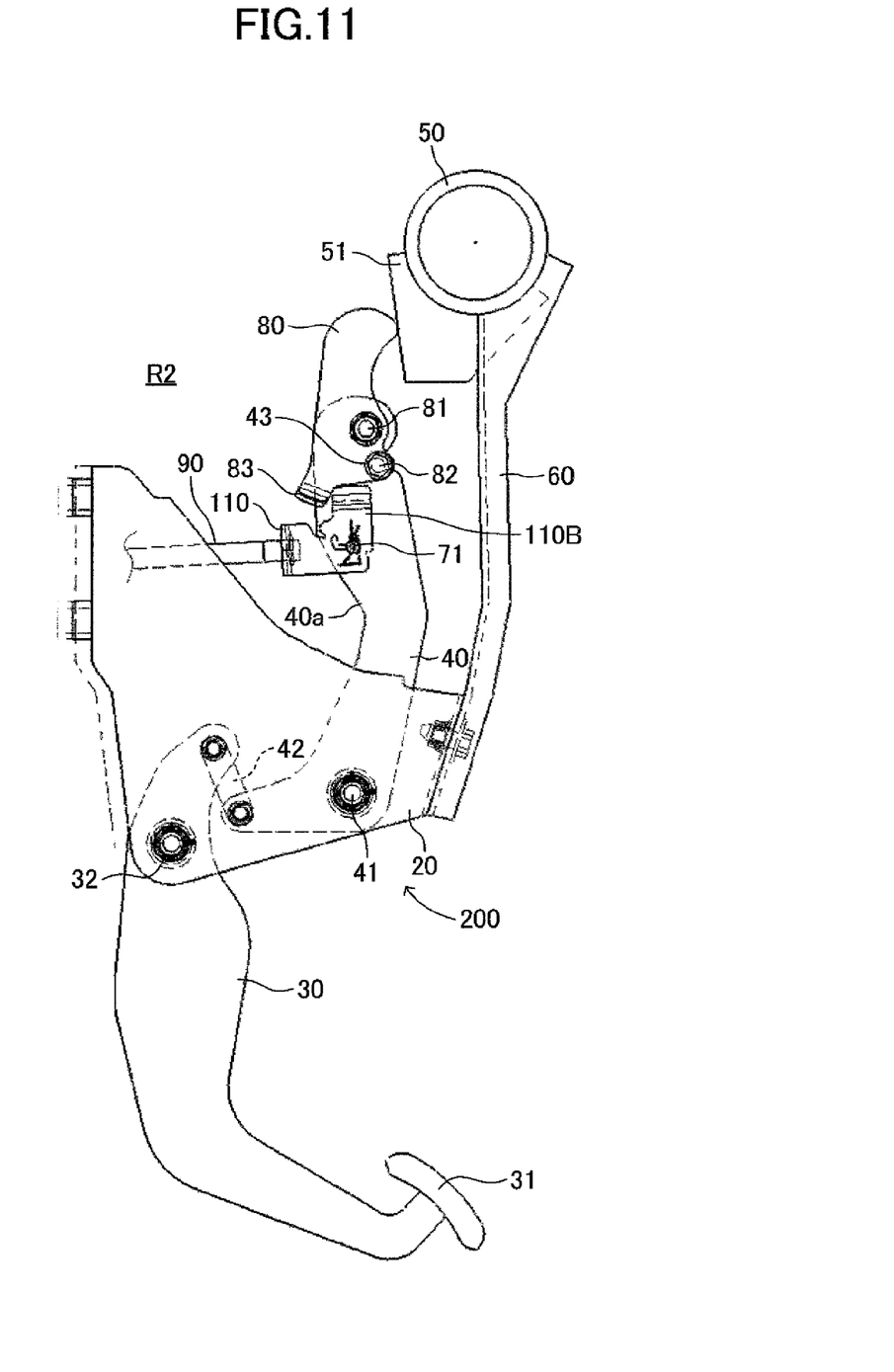
FIG. 11 is a side view of the vehicle brake pedal device of the second embodiment corresponding to FIG. 5.

On the other hand, when the vehicle having the vehicle brake pedal device 200 mounted thereon collides with another vehicle or the like located in front of that vehicle, the dash panel 10 is moved toward the vehicle cabin space R2 (backward) while being deformed. Then, as in the first embodiment, as illustrated in FIG. 11, the pedal bracket 20 is moved backward, and the brake arm 30, the coupling arm 40, the movable plate 80, and the like are also moved backward. Further, the coupling bracket 60 coupled to the pedal bracket 20 is deformed backward. As a result, in the early stage of action after the collision, the vehicle brake pedal device 200 shifts to a state of FIG. 11 via the state of FIG. 10. In other words, the upper end of the movable plate 80 is brought into abutment against the fixed member 51, and the movable plate 80 is rotated with respect to the coupling arm 40 by a reaction force applied by the fixed member 51 while causing the hold pin 82 to disengage backward from the cutout 43 formed in the rear edge of the movable plate 80.

As a result, the push part 83 of the movable plate 80 collides with the upper ends of the arm parts 110B and 110C of the clevis 110 from the front. Also according to this embodiment, the center of the rotational axis (support shaft 81) of the movable plate 80 is set behind and above the collision portion between the push part 83 of the movable plate 80 and the clevis 110. Thus, the impact force in a direction orthogonal to a straight line connecting the support shaft 81 and the collision portion to each other is generated in the clevis 110. Therefore, (a component force of) the impact force generated in the clevis 110 at this time breaks the breakable parts 110b4 and 110c4.

The breakable parts 110b4 and 110c4 are respectively formed between the front ends of the guide grooves 110b2 and 110c2 and the rear ends of the first cutouts 110b3 and 110c3. Further, positions and shapes of the guide grooves 110b2 and 110c2 and the first cutouts 110b3 and 110c3 are set so that widths of the breakable parts 110b4 and 110c4 are smaller than that of the breakable part 72 of the clevis 70. Thus, breaking loads of the breakable parts 110b4 and 110c4 of the clevis 110 are smaller than that of the breakable part 72 of the clevis 70. Therefore, when the push part 83 of the movable plate 80 collides with the clevis 110, the breakable parts 110b4 and 110c4 of the clevis 110 are securely broken.

Incidentally, as described above, when the driver depresses forward and obliquely downward the brake pedal pad 31 of the vehicle brake pedal device 200 in the normal state, the coupling pin 71 applies the forward and approximately horizontal pressing force F (refer to FIG. 8) to the front ends of the left and right insertion round holes 110b1 and 110c1 of the clevis 110.

However, as apparent from FIG. 8, the pressing force F is a force passing through a portion remote from the breakable parts 110b4 and 110c4.

Thus, when the driver depresses the brake pedal pad 31 forward and obliquely downward, there is no fear of the breakage of the breakable parts 110b4 and 110c4 of the clevis 110 by the pressing force F applied by the coupling pin 71 to the clevis 110.

Figure 12:
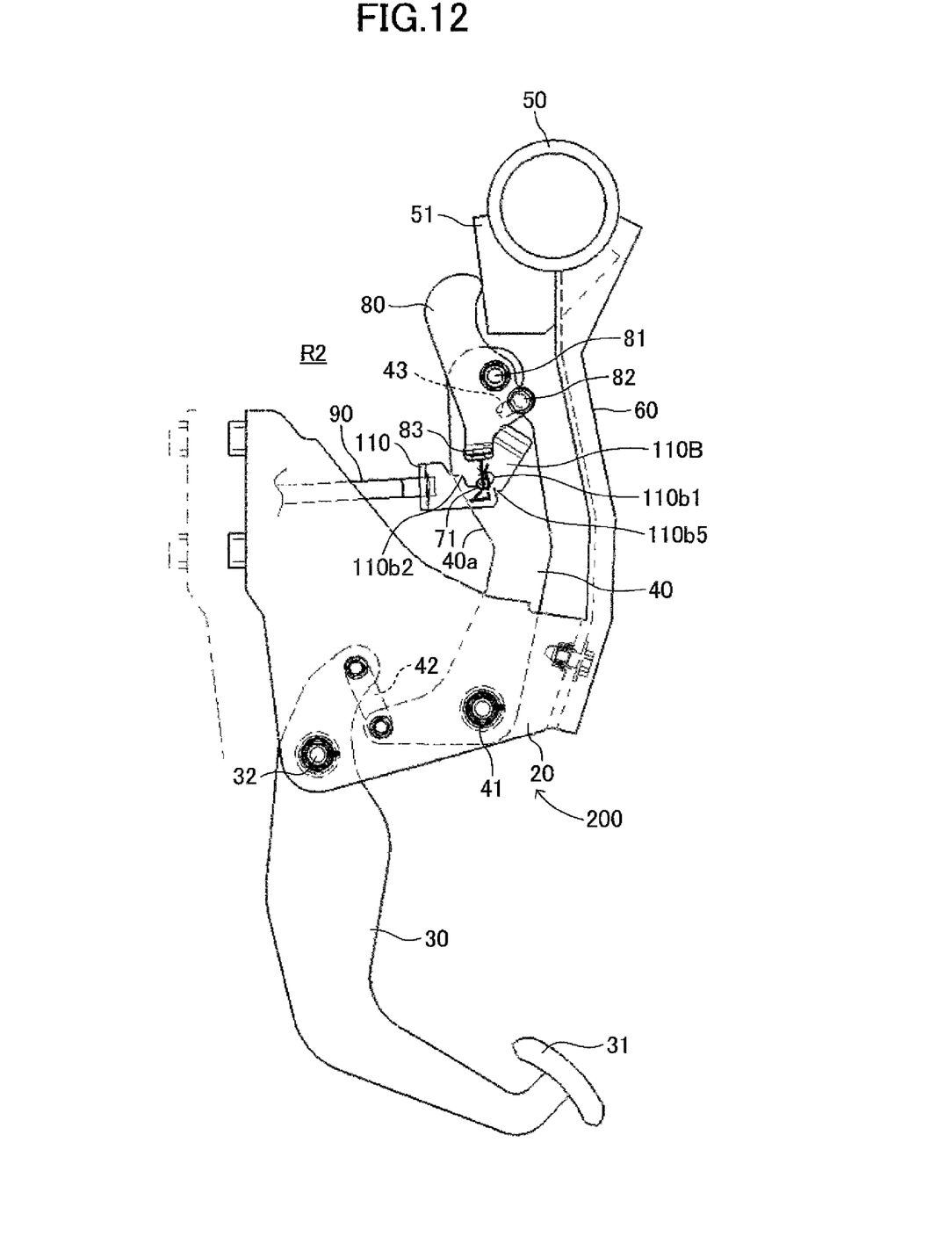
FIG. 12 is a side view of the vehicle brake pedal device of the second embodiment corresponding to FIG. 6.

Moreover, in the later stage of action after the collision, the vehicle brake pedal device 200 shifts from the state of FIG. 12 to a state of FIG. 13.

The breakable parts 110b4 and 110c4 are small (compared to the breakable part 72), and hence deformation amounts (stretching amounts) of the breakable parts 110b4 and 110c4 when the breakable parts 110b4 and 110c4 are broken are small. Further, portions adjacent to the front edges of the guide grooves 110b2 and 110c2 of the arm parts 110B and 110C and portions adjacent to the rear edges of the guide grooves 110b2 and 110c2 are hardly deformed (stretched). Therefore, energy of the impact force generated in the clevis 110 is used at a considerable ratio to relatively rotate backward portions located behind the broken parts of the arm parts 110B and 110C and including the rear edges of the guide grooves 110b2 and 110c2 with respect to portions located in front of the broken parts and including the front edges of the guide grooves 110b2 and 110c2 about the second cutouts 110b5 and 110c5. Therefore, fore-and-aft dimensions of gaps formed between the front edges and the rear edges of the guide grooves 110b2 and 110c2 become large.

Thus, the coupling pin 71 smoothly disengages from the gaps between the front edges and the rear edges of the guide grooves 110b2 and 110c2 upward with respect to the clevis 110. In other words, such a fear that the coupling pin 71 is caught on at least one of the front edges or the rear edges of the guide grooves 110b2 and 110c2, and, as a result, the coupling pin 71 cannot disengage upward with respect to the clevis 110 is low.

Note that, if the guide grooves 110b2 and 110c2 are not formed in the arm parts 110B and 110C, the breakable parts are large portions. As a result, the breakable parts are significantly deformed (stretched) by the impact force generated in the clevis 110, and then are broken. In other words, the energy of the impact force generated in the clevis 110 is used at a large ratio to deform the breakable parts. Therefore, a ratio of a part of the energy of the impact force, which is used to rotate backward the portions located behind the breakable parts of the arm parts 110B and 110C with respect to the portions located in front of the breakable parts, is small. Thus, there is such a fear that the portions located behind the breakable parts of the arm parts 110B and 110C cannot be sufficiently moved backward with respect to the portions located in front of the breakable parts. Therefore, in this case, there is such a fear that the coupling pin 71 is caught on at least one of the front edges and the rear edges of the broken parts of the arm parts 110B and 110C.

Further, the clevis 110, which has been released from the coupling pin 71, is guided backward and obliquely downward along the guide part 40a of the coupling arm 40.

Therefore, after the clevis 110 is decoupled from the coupling arm 40 (coupling pin 71), such a fear that the clevis 110 and the pushrod 90 are caught on the coupling arm 40, and, as a result, the downward movements of the clevis 110 and the pushrod 90 are blocked is low.

Figure 13:
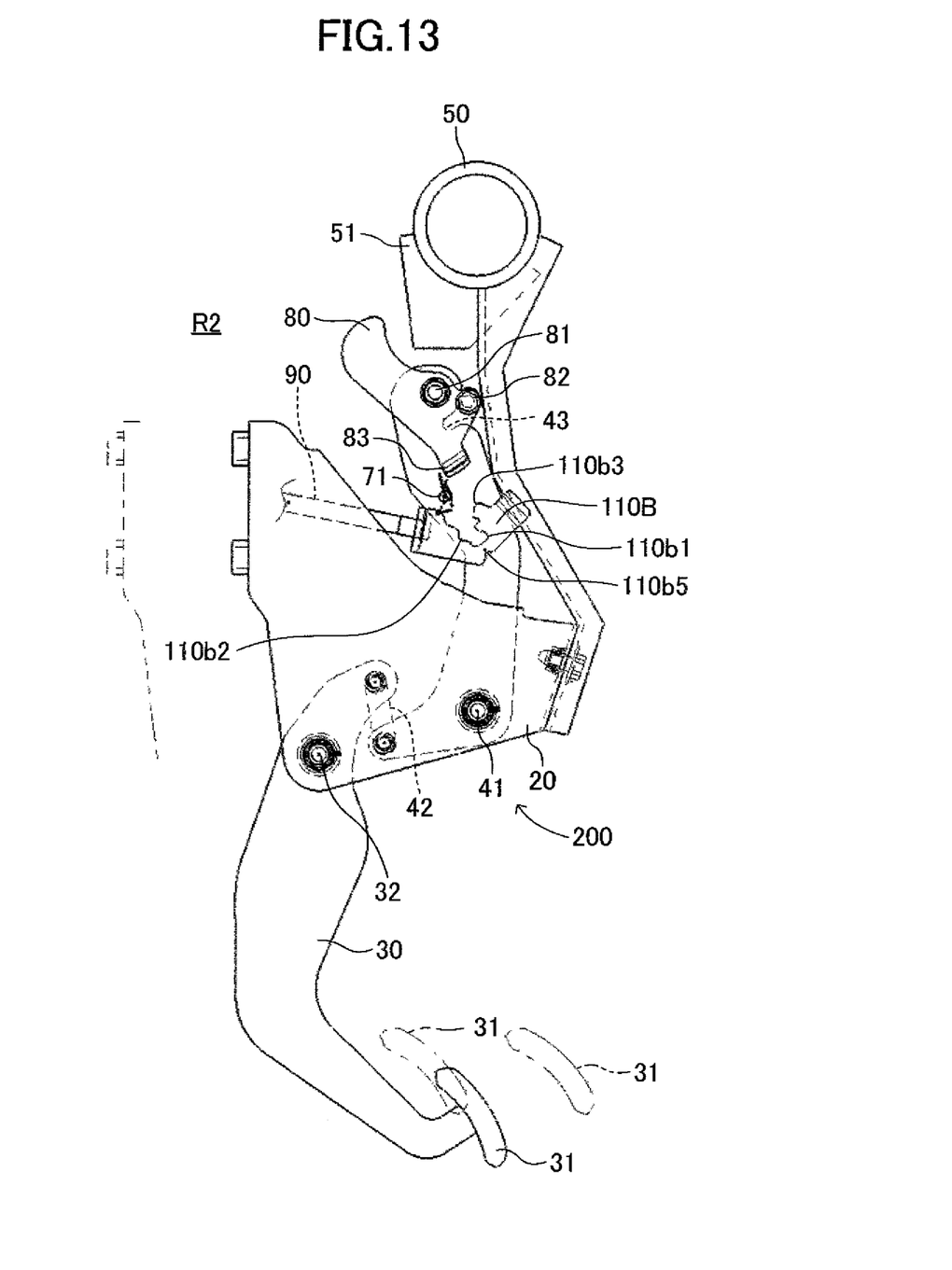
FIG. 13 is a side view of the vehicle brake pedal device of the second embodiment corresponding to FIG. 7.

Further, as illustrated in FIG. 13, the intermediate part of the coupling bracket 60 in the vertical direction, which is deformed backward along with the backward movement of the pedal bracket 20, collides with the component group of the above-mentioned steering device located immediately behind the coupling bracket 60. Therefore, the intermediate part of the coupling bracket 60 in the vertical direction is bent forward, and the bent part pushes forward the upper part of the coupling arm 40 with respect to the pedal bracket 20.

Thus, the coupling arm 40 is rotated with respect to the pedal bracket 20, and the brake arm 30 is rotated in a clockwise direction of FIG. 13 about the support shaft 32 with respect to the pedal bracket 20 so that the brake pedal pad 31 is moved forward. Therefore, a backward movement of the brake pedal pad 31 can be suppressed even though the dash panel 10 is moved (deformed) backward.

The brake pedal pad 31 indicated by the long dashed short dashed line of FIG. 13 indicates a position of the brake pedal pad 31 when the above-mentioned vehicle brake pedal device 200 is in the state of FIG. 10. The brake pedal pad 31 indicated by the long dashed double-short dashed line of FIG. 13 indicates a position of the brake pedal pad 31 when the above-mentioned vehicle brake pedal device 200 is in the state of FIG. 12.

As described above, also in the vehicle brake pedal device 200, when the dash panel 10 is deformed backward due to a collision of the vehicle or the like, the pushrod 90 is not bent (does not need to be bent). Therefore, the brake pedal device 200 can be mounted even on a vehicle (such as a minivan) in which the length L (refer to FIG. 10) in the vehicle fore-and-aft direction between the dash panel 10 and each of the instrument panel reinforcement 50 and the coupling bracket 60 is short and the length of the pushrod 90 is short.

Note that, the present invention is not limited to each of the above-mentioned embodiments, and may adopt various modified examples within the scope of the present invention.

Figure 14:
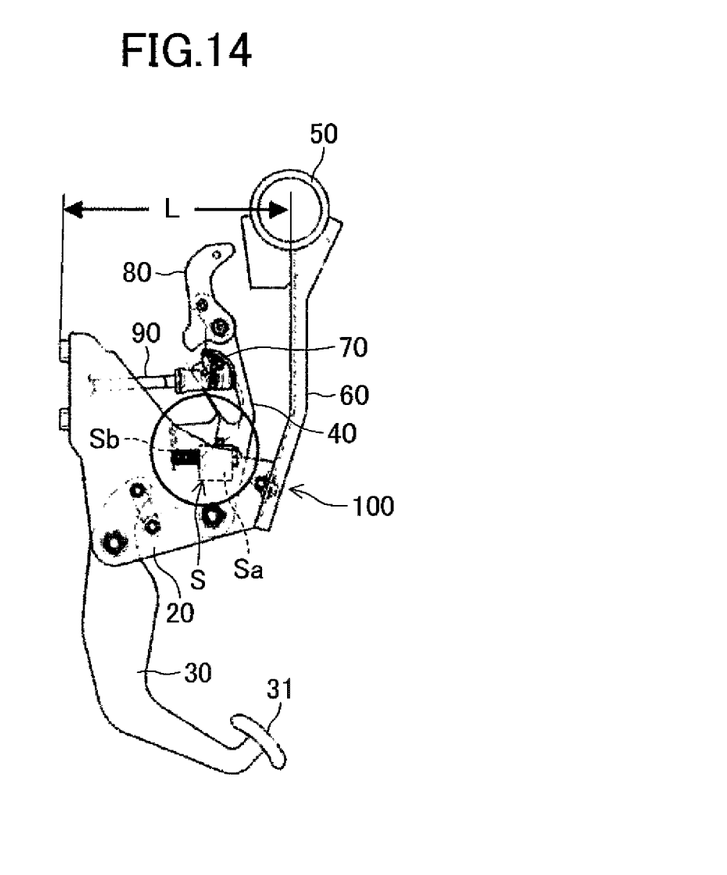
FIG. 14 is a side view of an example in which a depression force switch is installed on the vehicle brake pedal device illustrated in FIG. 1.

The above-mentioned vehicle brake pedal device 100 corresponds to an embodiment in which a depression force switch (brake switch) S is not installed. However, the present invention may be carried out while the depression force switch S is installed as exemplified in FIG. 14. The depression force switch S exemplified in FIG. 14 is provided between a rear upper part of the pedal bracket 20 and a lower part of the coupling arm 40, and includes a switch body Sa assembled to the pedal bracket 20 and a return spring Sb interposed between the switch body Sa and the coupling arm 40. Note that, the depression switch S is set so as to be turned on when the brake arm 30 is tilted by a predetermined amount from a return position illustrated in FIG. 14, and to be turned off when the brake arm 30 returns to the return position illustrated in FIG. 14.

As a matter of course, the depression force switch S may be applied to the vehicle brake pedal device 200 according to the second embodiment.

What is claimed is:

1. A vehicle brake pedal device, comprising:
   a pedal bracket, which is arranged between a partition wall configured to partition an outside and an inside of a vehicle cabin from each other and a vehicle body component arranged behind said partition wall, and is fixed to said partition wall;
   a brake arm, which is swingably supported by said pedal bracket, said brake arm comprising a brake pedal pad;
   a coupling arm, which is swingably supported by said pedal bracket, coupled at a portion located below a rotational center of said coupling arm to a top end of said brake arm via an arm link, and is coupled at a portion located above said rotational center to a pushrod linked to a braking device via a clevis;
   a movable plate, which is supported by said coupling arm under a state in which a rotation of said movable plate is restricted, and is rotatable with respect to said coupling arm when said restriction of said rotation is released;
   a fixed member, which is fixed to said vehicle body component, and is configured to be brought into abutment against said movable plate when said pedal bracket is displaced backward to release said restriction of said rotation, to thereby rotate said movable plate with respect to said coupling arm; and
   a coupling bracket, which is arranged behind said coupling arm, and is configured to couple said vehicle body component and said pedal bracket to each other,
   wherein:
   when said brake pedal pad is depressed forward so that said pushrod is pushed forward, said braking device is activated; and
   when said pedal bracket is displaced backward, said movable plate rotated with respect to said coupling arm is brought into contact with said clevis to break a breakable part, which is a coupling part of said clevis to said coupling arm, and said coupling bracket pushes forward said coupling arm displaced backward together with said pedal bracket to move said brake pedal pad forward while rotating said brake arm.

2. A vehicle brake pedal device according to claim 1, wherein a center of a rotational axis of said movable plate is set behind and above a portion at which said movable plate and said clevis are brought into abutment against each other.

3. A vehicle brake pedal device according to claim 1, wherein said coupling arm comprises a guide part, which is configured to guide backward and downward said clevis decoupled from said coupling arm.

4. A vehicle brake pedal device according to claim 1, wherein:
- said movable plate comprises a push part, which is configured to be brought into abutment against said clevis when said movable plate is rotated with respect to said coupling arm;
- said clevis comprises:
  - a base part configured to fasten said pushrod; and
  - a pair of arm parts extending backward from said base part and being positioned on both right and left sides of said coupling arm;
- said base part has a mounting hole through which an end of said pushrod is inserted;
- one of said pair of arm parts has:
  - an insertion round hole through which a coupling pin configured to couple said coupling arm and said clevis to each other is inserted; and
  - a cutout defining said breakable part;
- the other of said pair of arm parts has an insertion longhole through which said coupling pin is inserted; and
- said insertion longhole has:
  - a straight part capable of transmitting a rotational force of said coupling arm to said clevis; and
  - an open part configured to allow passage of said coupling pin when said push part is brought into abutment against said clevis.

5. A vehicle brake pedal device according to claim 1, wherein:
- said movable plate comprises a push part, which is configured to be brought into abutment against said clevis when said movable plate is rotated with respect to said coupling arm; and
- said clevis has:
  - an insertion round hole through which a coupling pin configured to couple said coupling arm and said clevis to each other is inserted;
  - a guide groove comprising a through groove extending from said insertion round hole toward an outer peripheral edge side of said clevis and being smaller in a width than a diameter of said insertion round hole; and
  - said breakable part, which is formed between an end of said guide groove on a side opposite to said insertion round hole and said outer peripheral edge, and is configured to be broken after said push part is brought into abutment against said clevis.

6. A vehicle brake pedal device according to claim 2, wherein said coupling arm comprises a guide part, which is configured to guide backward and downward said clevis decoupled from said coupling arm.

7. A vehicle brake pedal device according to claim 2, wherein:
- said movable plate comprises a push part, which is configured to be brought into abutment against said clevis when said movable plate is rotated with respect to said coupling arm;
- said clevis comprises:
  - a base part configured to fasten said pushrod; and
  - a pair of arm parts extending backward from said base part and being positioned on both right and left sides of said coupling arm;
- said base part has a mounting hole through which an end of said pushrod is inserted;
- one of said pair of arm parts has:
  - an insertion round hole through which a coupling pin configured to couple said coupling arm and said clevis to each other is inserted; and
  - a cutout defining said breakable part;
- the other of said pair of arm parts has an insertion longhole through which said coupling pin is inserted; and
- said insertion longhole has:
  - a straight part capable of transmitting a rotational force of said coupling arm to said clevis; and
  - an open part configured to allow passage of said coupling pin when said push part is brought into abutment against said clevis.

8. A vehicle brake pedal device according to claim 2, wherein:
- said movable plate comprises a push part, which is configured to be brought into abutment against said clevis when said movable plate is rotated with respect to said coupling arm; and
- said clevis has:
  - an insertion round hole through which a coupling pin configured to couple said coupling arm and said clevis to each other is inserted;
  - a guide groove comprising a through groove extending from said insertion round hole toward an outer peripheral edge side of said clevis and being smaller in a width than a diameter of said insertion round hole; and
  - said breakable part, which is formed between an end of said guide groove on a side opposite to said insertion round hole and said outer peripheral edge, and is configured to be broken after said push part is brought into abutment against said clevis.

* * * * *